US011599476B2

(12) United States Patent
Yoon

(10) Patent No.: US 11,599,476 B2
(45) Date of Patent: Mar. 7, 2023

(54) MEMORY SYSTEM AND OPERATING METHOD THEREOF

(71) Applicant: SK hynix Inc., Gyeonggi-do (KR)

(72) Inventor: Sang Don Yoon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 85 days.

(21) Appl. No.: 17/197,636

(22) Filed: Mar. 10, 2021

(65) Prior Publication Data

US 2022/0147460 A1    May 12, 2022

(30) Foreign Application Priority Data

Nov. 10, 2020 (KR) .................. 10-2020-0149026

(51) Int. Cl.
| | | |
|---|---|---|
| *G06F 12/0873* | (2016.01) | |
| *G06F 11/30* | (2006.01) | |
| *G06F 11/34* | (2006.01) | |
| *G06F 12/02* | (2006.01) | |
| *G06F 13/16* | (2006.01) | |
| *G06K 9/62* | (2022.01) | |
| *G06N 3/063* | (2006.01) | |
| *G06N 3/08* | (2006.01) | |
| *G06F 11/10* | (2006.01) | |
| *G06N 3/04* | (2006.01) | |
| *G06N 20/00* | (2019.01) | |
| *G06F 3/06* | (2006.01) | |

(52) U.S. Cl.
CPC ...... *G06F 12/0873* (2013.01); *G06F 11/3037* (2013.01); *G06F 11/3409* (2013.01); *G06F 12/0253* (2013.01); *G06F 13/1668* (2013.01); *G06K 9/6223* (2013.01); *G06N 3/063* (2013.01); *G06N 3/08* (2013.01)

(58) Field of Classification Search
CPC ............. G06F 12/0873; G06F 12/0253; G06F 13/1668
USPC ........................................................ 711/154
See application file for complete search history.

(56) References Cited

U.S. PATENT DOCUMENTS

| | | | |
|---|---|---|---|
| 2015/0186267 A1* | 7/2015 | Chun | G06F 1/3225 711/202 |
| 2017/0249256 A1* | 8/2017 | Kim | G06F 3/0685 |
| 2020/0073571 A1* | 3/2020 | Chen | G06N 5/04 |

FOREIGN PATENT DOCUMENTS

| | | |
|---|---|---|
| KR | 10-2013-0069745 | 6/2013 |
| KR | 10-2016-0040289 | 4/2016 |

* cited by examiner

*Primary Examiner* — Edward J Dudek, Jr.
*Assistant Examiner* — Sidney Li
(74) *Attorney, Agent, or Firm* — IP & T Group LLP

(57) ABSTRACT

Embodiments of the present disclosure relate to a memory system and an operating method thereof. According to the embodiments of the present disclosure, the memory system may monitor, in a state in which an address mapping information corresponding to a target device capable of inputting and outputting data corresponding to a specific address is first address mapping information, a first performance pattern which is an performance pattern for the target device, input information on the first performance pattern to an artificial intelligence engine which analyzes the performance pattern based on an artificial intelligence model and outputs address mapping information for the target device, and remaps a second address mapping information, which is the address mapping information output by the artificial intelligence engine, into address mapping information corresponding to the target device.

15 Claims, 14 Drawing Sheets address mapping

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| AM1 | CS | Row | | | | | | | | | | | | | | | | BA | | BG | | | Column | | | | | | | | | |
| AM2 | Row | | | | | | | | | | | | | | | | | BA | | Column | | | CS | BG | | Column | | | | | | |

FIG.6 address mapping

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |

AM1: CS | Row | BA | BG | Column

AM2: Row | BA | Column | CS | BG | Column

MEMORY SYSTEM AND OPERATING METHOD THEREOF

CROSS-REFERENCE TO RELATED APPLICATION

The present application claims priority under 35 U.S.C. 119(a) to Korean patent application number 10-2020-0149026 filed on Nov. 10, 2020, which is incorporated herein by reference in its entirety.

BACKGROUND

1. Technical Field

Embodiments relate to a memory system and an operating method thereof.

2. Related Art

A memory system includes a data storage device that stores data on the basis of a request from a host, such as a computer, servers, a smartphone, a tablet PC, or other electronic devices. Examples of the memory system include a traditional magnetic-disk-based hard disk drive (HDD) and a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read, write, and/or erase operations on the memory devices in the memory system. The memory controller may be used to execute firmware operations for performing a logical operation for controlling such operations.

In general, while a memory system reads or writes data, mapping information on the address corresponding to data may be in a fixed state. Accordingly, there may be a possibility that the memory system may not perform optimally depending on the characteristics of data to be read or written.

SUMMARY

Embodiments of the disclosure provide a memory system and an operating method thereof capable of dynamically changing address mapping information for optimal read/write performance.

In one aspect, an embodiment of the disclosure provides a memory system including a memory device, and a memory controller for communicating with the memory device and controlling the memory device.

The memory controller may include an artificial intelligence engine and may receive, by the artificial intelligence engine, a performance pattern of a target device capable of inputting and outputting data corresponding to a specific address, and for analyzing the performance pattern based on an artificial intelligence model and outputting address mapping information capable of reducing latency of input and output data for the target device.

The memory controller may monitor, in a state in which the address mapping information corresponding to the target device is first address mapping information, the first performance pattern which is the performance pattern for the target device.

The memory controller may input information on the first performance pattern to the artificial intelligence engine.

The memory controller may remap a second address mapping information, which is the address mapping information output after the artificial intelligence engine receives the information on the first performance pattern, into address mapping information corresponding to the target device.

In another aspect, an embodiment of the disclosure provides an operating method of a memory system including a memory device.

The operating method of the memory system may include monitoring, in a state in which an address mapping information corresponding to a target device capable of inputting and outputting data corresponding to a specific address is a first address mapping information, a first performance pattern which is a performance pattern for the target device.

The operating method of the memory system may include inputting information on the first performance pattern to an artificial intelligence engine which receives the performance pattern of the target device and outputs address mapping information capable of reducing latency of input and output data for the target device by analyzing the performance pattern based on an artificial intelligence model.

The operating method of the memory system may include remapping a second address mapping information, which is the address mapping information output by the artificial intelligence engine, into address mapping information corresponding to the target device.

In another aspect, an embodiment of the disclosure provides a memory system including a memory device and a memory controller including a working memory and an artificial intelligence engine.

The memory controller may perform input and output of data for a memory region of a target device associated with first address mapping information, the target device including the working memory or the memory device.

The memory controller may monitor a performance pattern associated with the input and output of the data.

The memory controller may determine and store, by using the artificial intelligence engine, second address mapping information such that latency associated with the input and output of the data is minimized, based on the performance pattern.

The memory controller may remap mapping information for the memory region to the second address mapping information.

The memory controller may remap the mapping information for the memory region into the second address mapping information after the memory system boots or wakes up from an idle state.

According to the embodiments of the disclosure, it is possible to dynamically change the address mapping information to achieve optimal read/write performance.

BRIEF DESCRIPTION OF THE DRAWINGS

FIG. 6 is a diagram illustrating an example of address mapping information according to embodiments of the present disclosure.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
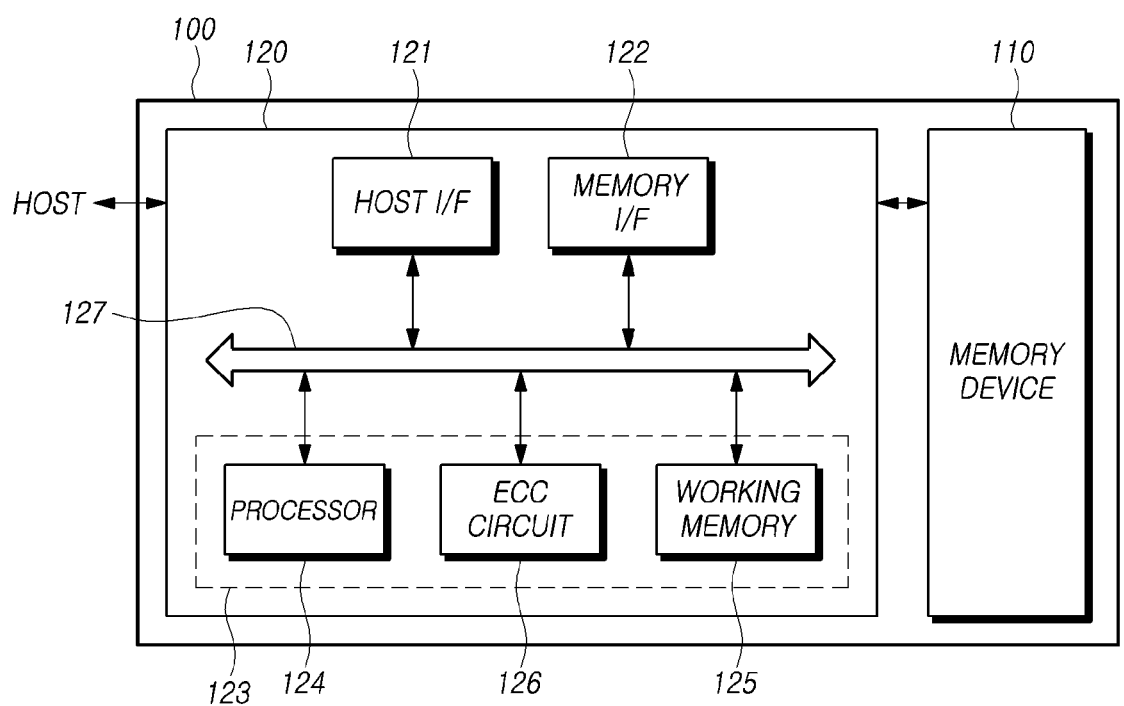
FIG. 1 is a schematic diagram illustrating a configuration of a memory system according to an embodiment of the disclosed technology.

FIG. 1 is a diagram illustrating the schematic configuration of a memory system 100 according to an embodiment of the disclosed technology.

Referring to FIG. 1, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation also referred to as a "write operation", an erase operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erase operation, and the like. During the program operation, the memory device 110 may write data in the area selected by the address. During the read operation, the memory device 110 may read data from a memory area selected by the address. During the erase operation, the memory device 110 may erase data stored in a memory area selected by the address.

The memory controller 120 may control write (program), read, erase, and background operations that are performed on the memory device 110. The background operation may include, for example, operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of a request from the host when it performs such background operations of the memory device 110.

The memory controller 120 and the host may be separate devices. In some implementations, the memory controller 120 and the host may be integrated and implemented as a single device. In the following description, the memory controller 120 and the host will be discussed as separate devices as an example.

As illustrated in FIG. 1, the memory controller 120 may include a host interface (I/F) 121, a memory interface (I/F) 122 and a control circuit 123.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126.

The processor 124 may control the overall operation of the memory controller 120. The processor 124 may perform a logical operation. The processor 124 may communicate with the host through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW) to control the operation of the memory controller 120. The processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL), a host interface layer (HIL) and a flash interface layer (FIL). The flash translation layer is configured to translate a logical address from the host to a physical address of the memory device 110. The host interface layer is configured to interpret a command that the host issues to a data storage device such as the memory system 100 and to deliver the command to the FTL. The flash interface layer is configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs decoding using nonsystematic code or a decoder that performs decoding using systematic code may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is greater than a reference value, the error detection/correction circuit 126 may determine that the erroneous bits in the corresponding sector are uncorrectable and the corresponding sector is marked "fail." If the BER is less than or equal to the reference value, the error detection/correction circuit 126 may determine that the corresponding sector is correctable or the corresponding sector can be marked "pass."

The error detection/correction circuit 126 may perform error detection and correction operations successively on all read data. When a sector in the read data is correctable, the error detection/correction circuit 126 may move on to the next sector to check whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
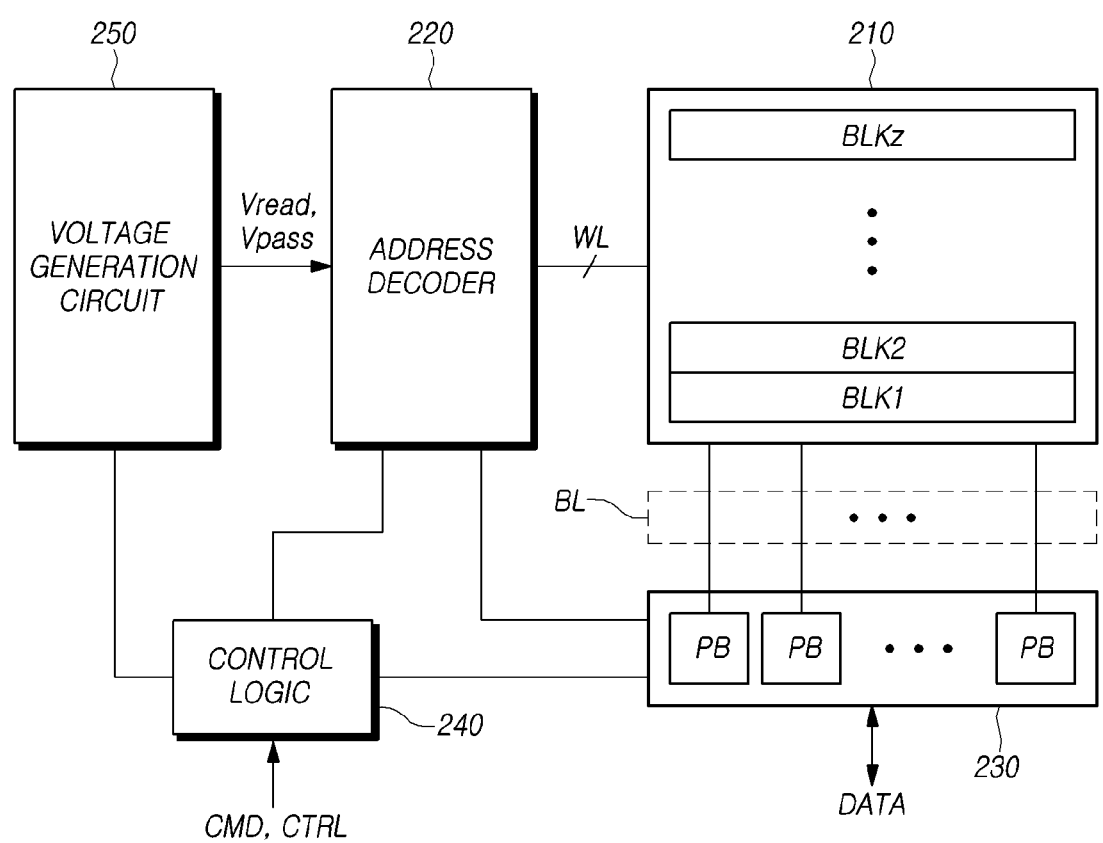
FIG. 2 is a block diagram schematically illustrating a memory device according to an embodiment of the disclosed technology.

FIG. 2 is a block diagram schematically illustrating a memory device 110 according to an embodiment of the disclosed technology.

Referring to FIG. 2, the memory device 110 may include a memory cell array 210, an address decoder 220, a read/write circuit 230, a control logic 240, and a voltage generation circuit 250.

The memory cell array 210 may include multiple memory blocks BLK1-BLKz, where z is a natural number greater than or equal to 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

In some implementations, the memory cell array 210 may be configured as a memory cell array having a two-dimensional structure. In other implementations, the memory cell array 210 may be arranged in a three-dimensional structure.

Each of the multiple memory cells in the memory cell array 210 may store at least one bit of data. For example, each of the multiple memory cells may be a single-level cell (SLC) configured to store one bit of data. In another example, each of the multiple memory cells may be a multi-level cell (MLC) configured to store two bits of data per memory cell. In another example, each of the multiple memory cells may be a triple-level cell (TLC) configured to store three bits of data per memory cell. In another example, each of the multiple memory cells may be a quad-level cell (QLC) configured to store four bits of data per memory cell. In another example, the memory cell array 210 may include multiple memory cells, each of which may be configured to store at least five bits of data per memory cell.

As illustrated in FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to commands and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

During a read operation, the address decoder 220 may apply the read voltage Vread to a selected word line WL inside a selected memory block and apply the pass voltage Vpass to the remaining non-selected word lines WL.

During a program verification operation, the address decoder 220 may apply a verification voltage generated by the voltage generation circuit 250 to a selected word line WL inside a selected memory block and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. In another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain or source of the transistor TR may be connected to the corresponding bit line BL directly or via another transistor TR. The source or drain of the transistor TR may be connected to the source line which may be the ground, directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line also referred to as a source selection line or a drain selection line, may be additionally arranged outside the first outermost word line, which is closer to the read/write circuit 230 among two outermost word lines, and a second selection line also referred to as a drain selection line or a source selection line, may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, whereas an erase operation may be performed memory block by memory block.

Figure 3:
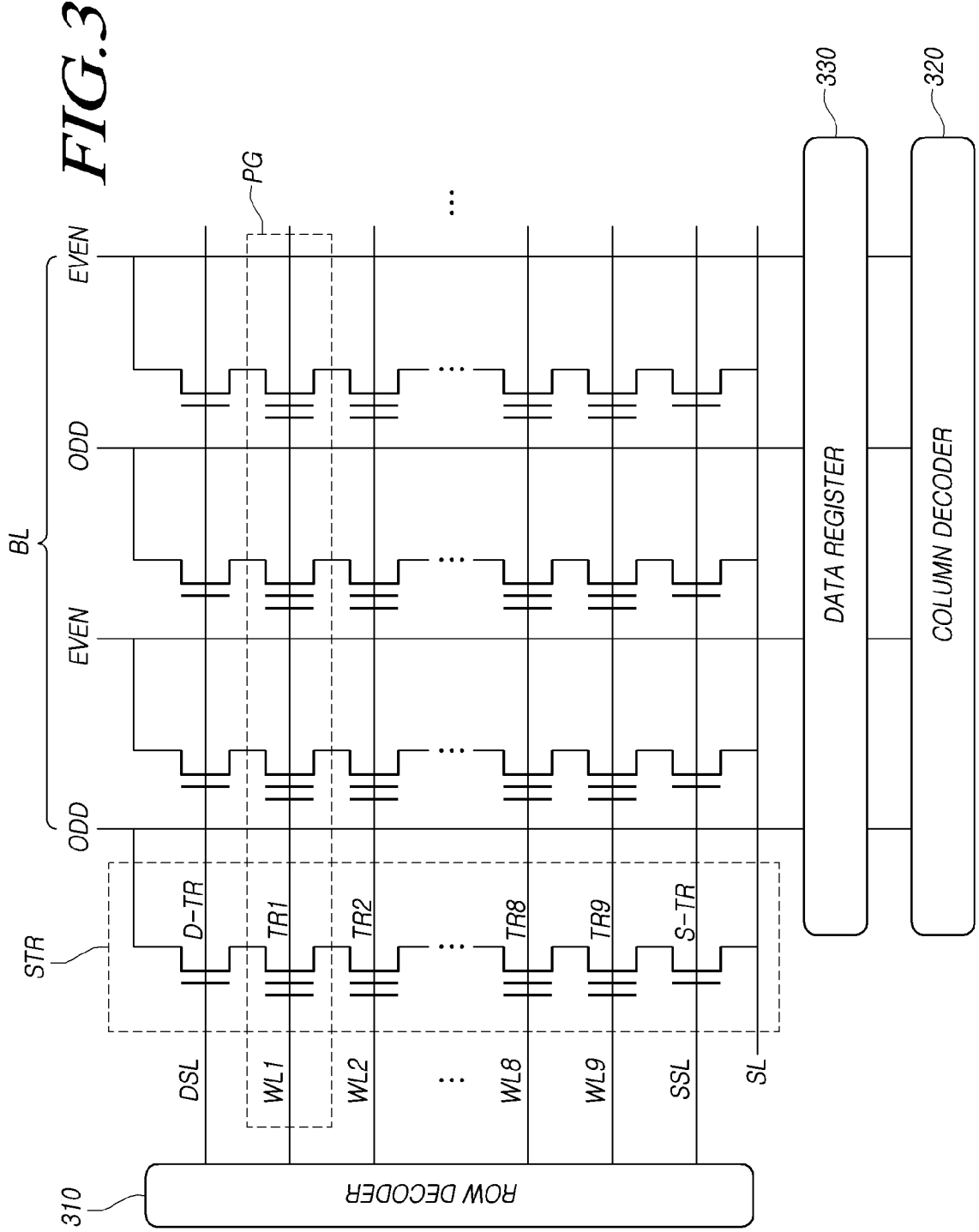
FIG. 3 is a diagram illustrating a structure of word lines and bit lines of a memory device according to an embodiment of the disclosed technology.

FIG. 3 is a diagram illustrating a structure of word lines WL and bit lines BL of a memory device 110 according to an embodiment of the disclosed technology.

Referring to FIG. 3, the memory device 110 has a core area in which memory cells MC are arranged, and an auxiliary area (i.e., the remaining area other than the core area) to include circuitry that is used to perform the operations of the memory cell array 210.

In the core area, a certain number of memory cells arranged in one direction may be called a "page" PG, and a certain number of memory cells that are coupled in series may be called a "memory cell string" STR.

The word lines WL1-WL9 may be connected to a row decoder 310. The bit lines BL may be connected to a column decoder 320. A data register 330, which corresponds to the read/write circuit of FIG. 2, may exist between the multiple bit lines BL and the is column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line are coupled in common to the column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the is other areas need to wait until the data register 330 finishes the data processing, degrading the overall performance of the memory device 110.

In the illustrated example of FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR may be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR. Further, the memory system 100 applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erase operation. The memory system 100 applies a certain voltage to allow both the first selection transistor D-TR and the second selection transistor S-TR to float during an erase operation. As a result, the applied voltages can remove electrical charges from the floating gates FG of the selected memory cells.

Figure 4:
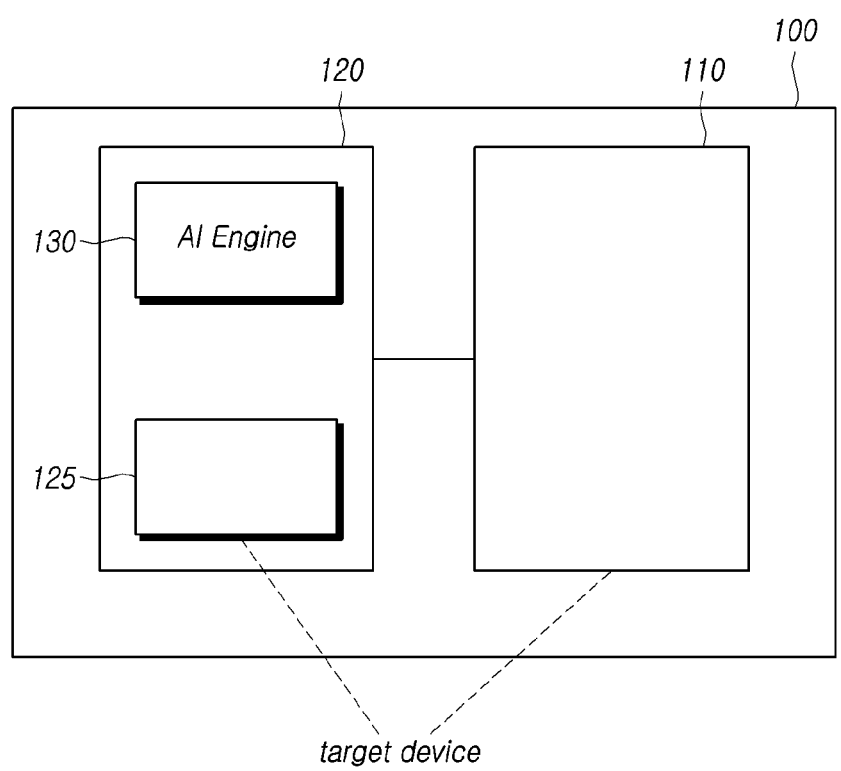
FIG. 4 is a diagram illustrating a schematic structure of the memory system according to embodiments of the present disclosure.

FIG. 4 is a diagram illustrating a schematic structure of the memory system 100 according to embodiments of the present disclosure.

Referring to FIG. 4, the memory system 100 may include the memory device 110 and the memory controller 120. The memory controller 120 may include an artificial intelligence (AI) engine 130.

The artificial intelligence engine 130 may receive the input/output performance pattern of a target device and may analyze the input/output performance pattern based on an artificial intelligence model so as to output address mapping information capable of reducing latency when inputting/outputting data for the target device. In some embodiments, the artificial intelligence model may be a machine learning model (e.g., decision tree, random forest) or a deep learning model (e.g., Convolutional Neural Network (CNN), Recurrent Neural Network (RNN)).

The target device is a device which can input/output data corresponding to a specific address. The target device may be, for example, the memory device 110 or the working memory 125 of the memory system 100.

The artificial intelligence engine 130 may be implemented as a hardware circuit in the memory controller 120 or as a software module driven by the processor 124. For example, the processor 124 may execute the artificial intelligence engine 130 by running a software module defining a function of the artificial intelligence engine 130 in firmware using a separate process or thread.

Figure 5:
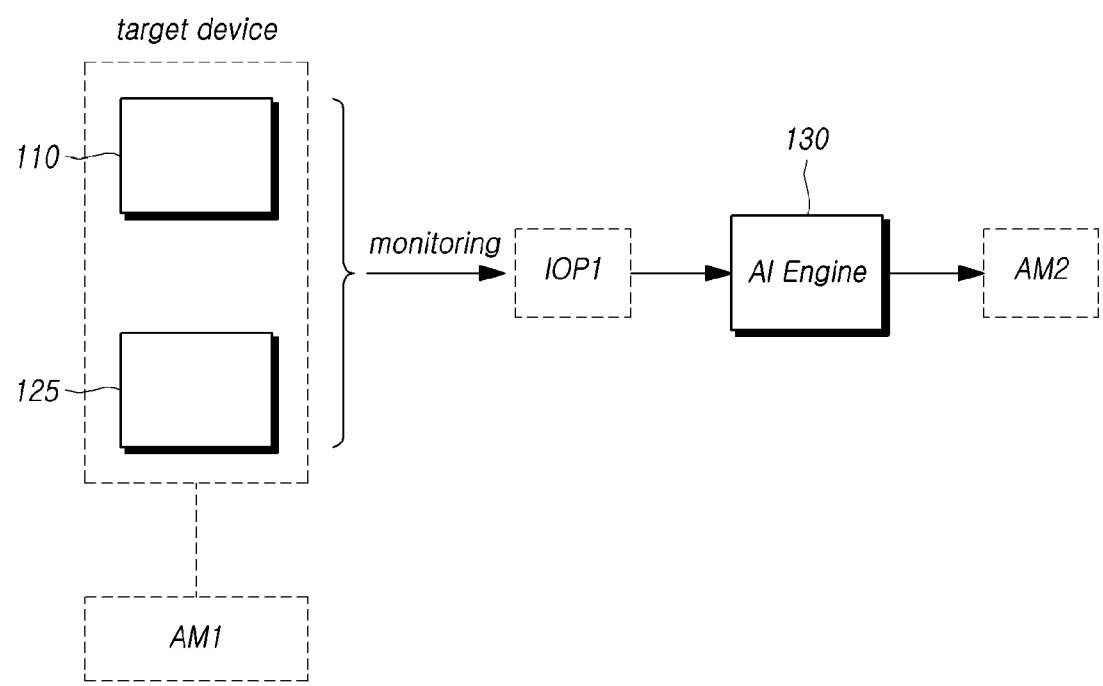
FIG. 5 is a diagram illustrating a schematic operation of the memory system according to embodiments of the present disclosure.

FIG. 5 is a diagram illustrating a schematic operation of the memory system 100 according to embodiments of the present disclosure.

Referring to FIG. 5, the address mapping information corresponding to the target device is a first address mapping information AM1. In this state, the memory controller 120 of the memory system 100 may monitor a first input/output performance pattern IOP1 which is the input/output performance pattern for the target device.

The memory controller 120 may monitor the first input/output performance pattern IOP1 at each set period. Alternatively, the memory controller 120 may monitor the first input/output performance pattern IOP1 when a specific condition is satisfied. For example, the specific condition incudes the case in which the input/output performance of the target device is less than or equal to a set reference value, or the case in which the host transmits a message for requesting to monitor the input/output performance of the target device.

In some embodiments, the target device may be the working memory 125 or the memory device 110 as described above in FIG. 4.

For example, the input/output performance pattern for the target device may include information on latency generated in the process of inputting or outputting data from or to the target device. That is, the input/output performance pattern for the target device may indicate information on the delay time required in the process of inputting or outputting data from or to the target device.

The input/output performance pattern for the target device may be referred to as a term such as a workload for the target device, and the meaning is not limited by the terms.

In addition, the memory controller 120 may input (or transfer) information on the monitored first input/output performance pattern IOP1 to the artificial intelligence engine 130.

In addition, the memory controller 120 may remap the second address mapping information AM2, which is the address mapping information output from the artificial intelligence engine 130, to address mapping information corresponding to the target device.

As described above, in the embodiments of the present invention, the memory system 100 dynamically remaps address mapping information corresponding to the target device through the artificial intelligence engine 130, thereby optimizing the input/output performance of the target device. As a result, it is possible to optimize the performance of the memory system 100 for reading/writing data according to the request of the host.

Hereinafter, the address mapping information will be described.

FIG. 6 is a diagram illustrating address mapping information according to embodiments of the present disclosure.

Referring to FIG. 6, the address mapping information may indicate to which information each bit of an address is mapped. Hereinafter, in the embodiments of the present disclosure, it will be described the case in which the number of bits of the address is 32 bits as an example, but the number of bits of the address is not limited, and may be set to 16 bits, 64 bits, 128 bits, or the like.

For example, when the target device is the working memory 125, the address mapping information may include chip select (CS) mapping information, row mapping information, column mapping information, bank mapping information and bank group (BG) mapping information.

The chip select mapping information may indicate which bits of addresses are mapped to a chip select address. The row mapping information may indicate which bits of addresses are mapped to a row address. The column mapping information may indicate which bits of addresses are mapped to a column address. The bank mapping information may indicate which bits of addresses are mapped to a bank address. The bank group mapping information may indicate which bits of the addresses are mapped to the bank group address.

In embodiments of the present invention, the number of bits corresponding to each of the chip select address, the row address, the column address, the bank address, and the bank group address may be fixed. However, the bits mapped for each of the chip select address, row address, column address, bank address, and bank group address may be changed.

In FIG. 6, the 32-bit address may include the 1-bit chip select address (i.e., CS), the 16-bit row address (i.e., Row), the 2-bit bank address (i.e., BA), the 2-bit bank group address (i.e., BG), and the 9-bit column address (i.e., Column).

For example, the first address mapping information AM1 may indicate that the 31st bit of the addresses is the chip select address (i.e., CS), bits from 30th to 15th are row addresses (i.e., Row), bits from 14th to 13th are bank addresses (i.e., BA), bits from 12th to 11th are bank group addresses (i.e., BG), and bits from 10th through 2nd are column addresses (i.e., Column).

For example, the second address mapping information AM2 may indicate that the bits from 31st to 16th of the addresses are row addresses (i.e., Row), bits from 15th to 14th are bank addresses (i.e., BA), 8th bit is chip select address (i.e., CS), bits from 7th to 6th are bank group addresses (i.e., BG), and bits from 13th to 9th and from 5th through 2nd are column addresses (i.e., Column).

In the case that the target device is the memory device 110, the address mapping information may include chip enable mapping information, which may indicate which bits of addresses are mapped to the chip enable address. The chip enable address is an address indicating which memory die is mapped to the corresponding address among a plurality of memory dies in the memory device 110.

When the address mapping information is changed as described above, a difference may occur in the performance of a device for inputting/outputting data based on the address mapping information. For example, depending on which bit of the address is mapped to the chip select address, there may be a difference in turnaround time required during data input/output according to chip select interleaving. As a result, the difference may occur in the performance of the device for inputting/outputting data.

Figure 7:
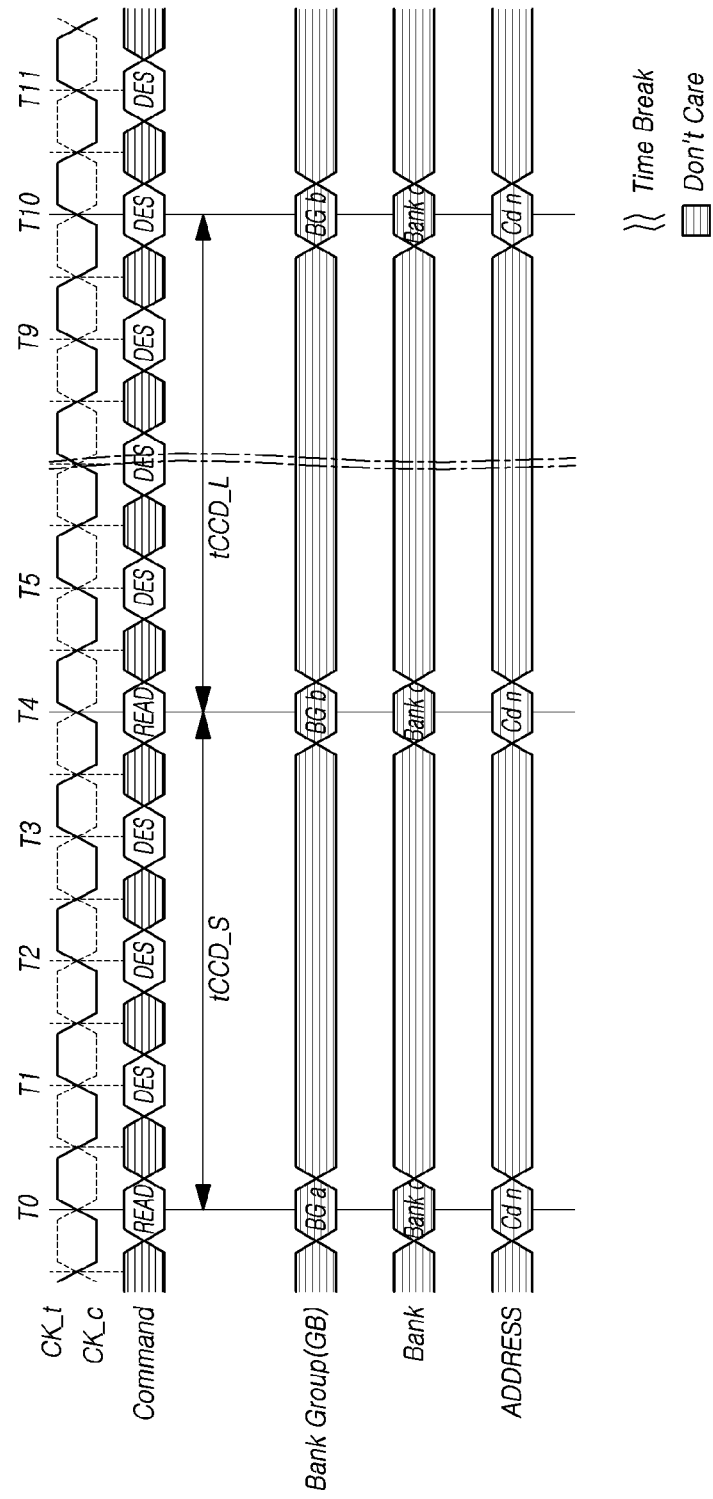
FIG. 7 is a diagram illustrating an example of the operation of the working memory according to embodiments of the present disclosure.

FIG. 7 is a diagram illustrating the operation of the working memory 125 according to embodiments of the present disclosure.

FIG. 7, illustrates that the memory controller 120 reads data from the working memory 125. When reading data from one bank group and then reading data from another bank group, a latency of tCCD_S or more should be kept. In addition, when reading data from one bank group and then reading data from the same bank group again, a latency of tCCD_L or more should be kept. In FIG. 7, the latency from reading the data of the bank group BG_a to reading the data of the bank group BG_b is tCCD_S, and the latency from reading the data of the bank group BG_b to reading again the data of the bank group BG_b is tCCD_L.

For example, the value of tCCD_L is greater than tCCD_S. That is, the latency when reading data from the same bank group is greater than the latency when reading data from different bank groups. Accordingly, the address of the working memory 125 may map the bit mapped to the bank group address to the bit lower than the bit mapped to the bank address in order to determine the bank group before the bank. When the address of the data to be read changes during the process of reading data, the latency of the data reading process may be tCCD_L or tCCD_S depending on what information is mapped to the location where the address changes. In this case, the memory controller 120 may remap the address mapping information so that the latency is changed from tCCD_L to tCCD_S when reading one data and then reading another data, thereby reducing the overall latency required when reading data. However, the rate of reduction in latency (e.g., 33%) may vary depending on the situation.

Furthermore, there is no clear criterion as to which bit of the address should be mapped to the address of the bank group, and this may vary depending on the characteristics of data input/output during the read process. Additionally, not only the relationship between the bank address and the bank group address, but also the relationship between the chip select address, the row address, and the column address may vary according to the characteristics of input/output data.

Therefore, in embodiments of the present disclosure, the memory controller 120 may determine address mapping information for securing optimal input/output performance for the target device. In some embodiments, the characteristics of the data input and output to the target device may be determined in various and complex ways based on a number of criteria including the characteristics of the host (e.g., operating system OS of the host), environment information (e.g., operation time, power supplied), and characteristics of the target device (e.g., maximum bandwidth). Therefore, the memory controller 120 may perform continuous unsupervised learning on the artificial intelligence model used by the artificial intelligence engine 130, instead of determining the address mapping information according to a specific criterion, so that the artificial intelligence engine 130 may output address mapping information capable of reducing latency occurring during an input/output operation. Through this, the artificial intelligence engine 130 may determine address mapping information capable of securing optimal input/output performance for the target device.

In an example, in order to perform unsupervised learning on the artificial intelligence model, the memory controller 120 may measure the latency occurring during data input/output operations when the address mapping information output from the artificial intelligence engine 130 is used. Then, the memory controller 120 may compare the measured latency with the latency occurring during data input/output operations when the existing address mapping information is used. In addition, the memory controller 120 may perform the learning by modifying the artificial intelligence model used by the artificial intelligence engine 130 by using the method such as gradient descent method and back propagation method based on the comparison result (e.g., changing the weight applied to each node in the hidden layer of the artificial intelligence model).

Above, the operation in which the memory system 100 remaps address mapping information for the target device is described.

Hereinafter, a specific example of the operation of the artificial intelligence engine 130 used by the memory system 100 to remap address mapping information for the target device with reference to FIGS. 8 to 10, will be described.

Figure 8:
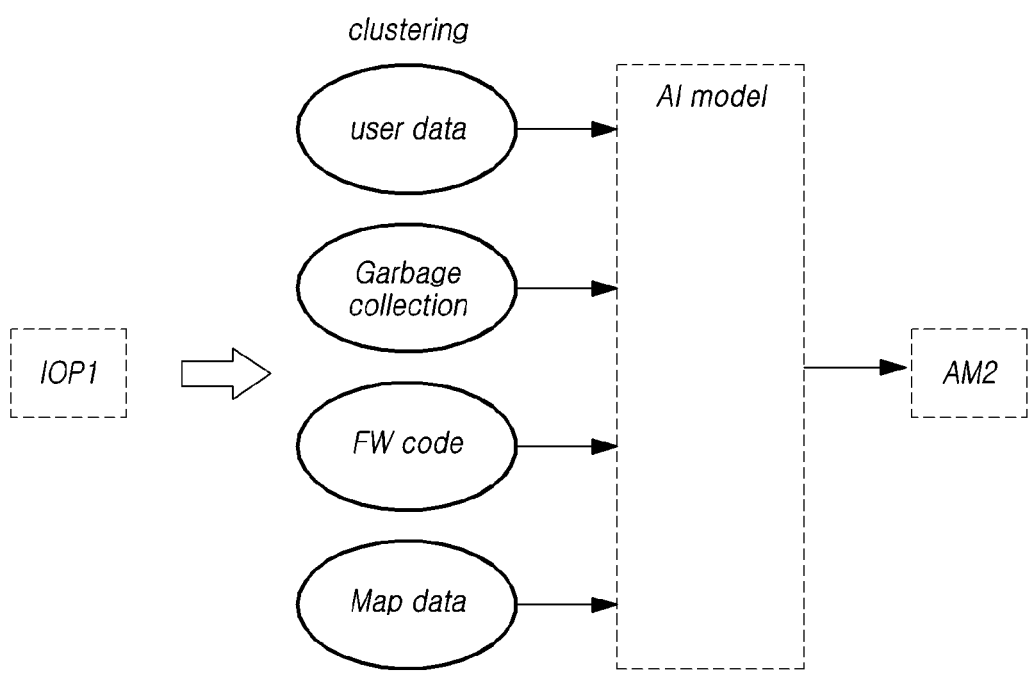
FIG. 8 is a diagram illustrating a schematic operation of the artificial intelligence engine according to embodiments of the present disclosure.

FIG. 8 is a diagram illustrating a schematic operation of the artificial intelligence engine 130 according to embodiments of the present disclosure.

Data input/output to the target device (e.g., the working memory 125 or memory device 110) may have different sizes and occurrence frequencies depending on the characteristics of the data. Accordingly, the artificial intelligence engine 130 may specify the characteristics of the data input/output to the target device by clustering information in the input input/output performance pattern according to the characteristics of the data.

Referring to FIG. 8, the artificial intelligence engine 130 may receive the first input/output performance pattern IOP1 and cluster information in the first input/output performance pattern IOP1 into at least one cluster of 1) a user data cluster, 2) a garbage collection data cluster, 3) a firmware (FW) code cluster, and 4) a map data cluster.

The user data cluster is a cluster including data for which the host requests read or write. The garbage collection data cluster is a cluster including data read or written during a garbage collection operation. The firmware code cluster is a cluster including firmware codes that the memory controller 120 reads or writes to run the firmware. The map data cluster is a cluster including map data indicating a mapping relationship between a logical address on the host and a physical address on the memory device 110.

The artificial intelligence engine 130 may analyze each cluster generated by clustering based on the specific artificial intelligence model. Further, the artificial intelligence engine 130 may output the second address mapping information AM2 based on the result derived by the artificial intelligence model.

The number of clusters and characteristics of each cluster described in FIG. 8 are exemplary. The number of clusters clustered by the artificial intelligence engine 130 and characteristics of each cluster may vary according to implementation.

Figure 9:
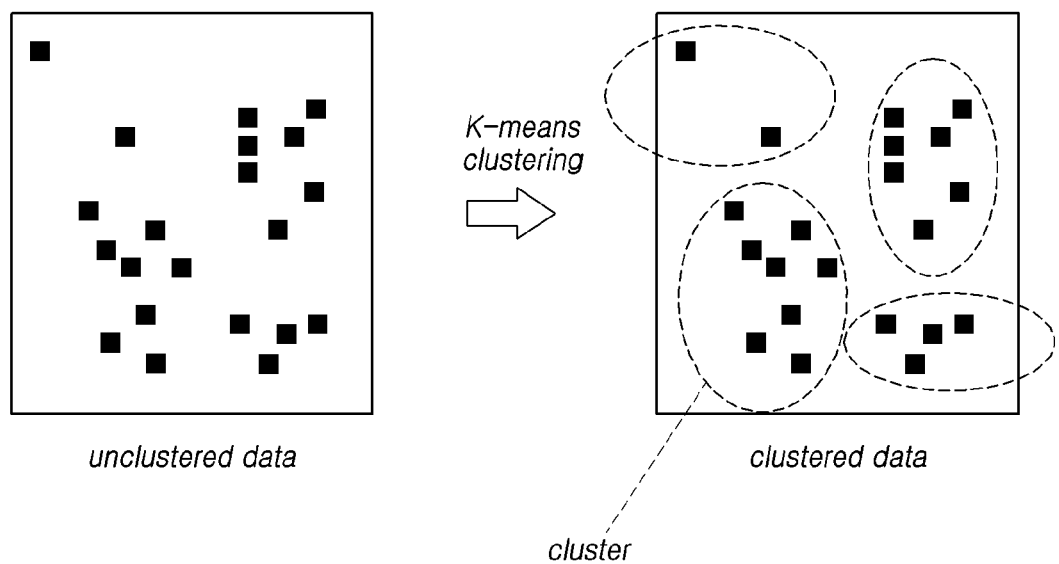
FIG. 9 is a diagram illustrating an example of clustering information on the performance pattern by the artificial intelligence engine according to embodiments of the present disclosure.

FIG. 9 is a diagram illustrating clustering information on the performance pattern by the artificial intelligence engine 130 according to embodiments of the present disclosure.

Referring to FIG. 9, the artificial intelligence engine 130 may cluster information in the first input/output performance pattern IOP1 by using a set algorithm (e.g., K-means clustering algorithm). In order to cluster the non-clustered information into K clusters, the K-means clustering algorithm can operate in a manner that minimizes variance of differences between each cluster and each information.

Figure 10:
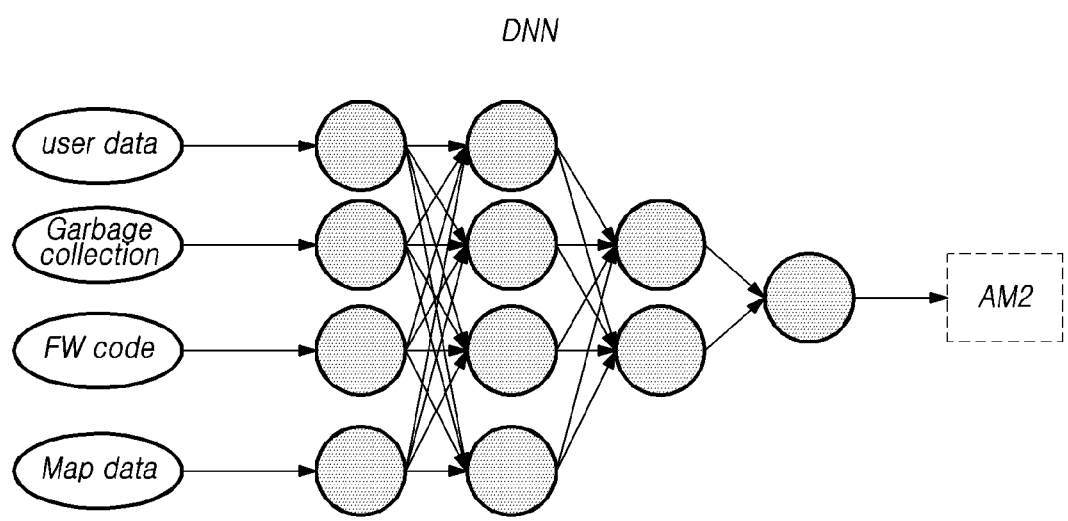
FIG. 10 is a diagram illustrating an example of a model used by the artificial intelligence engine according to embodiments of the present disclosure.

FIG. 10 is a diagram illustrating a model used by the artificial intelligence engine 130 according to embodiments of the present disclosure.

Referring to FIG. 10, the artificial intelligence engine 130 may generate second address mapping information AM2 by analyzing one or more clusters clustered in FIG. 9 based on a deep neural network (DNN). DNN is an artificial intelligence model in which one or more hidden layers are located between an input layer and an output layer.

The artificial intelligence engine 130 may receive one or more clusters clustered in FIG. 9 through the input layer, pass the received clusters through one or more hidden layers, and output the value corresponding to address mapping information through the output layer. In some embodiments, the nodes of each hidden layer may output values calculated by applying different weights to values input from different input nodes to the next layer.

Figure 11:
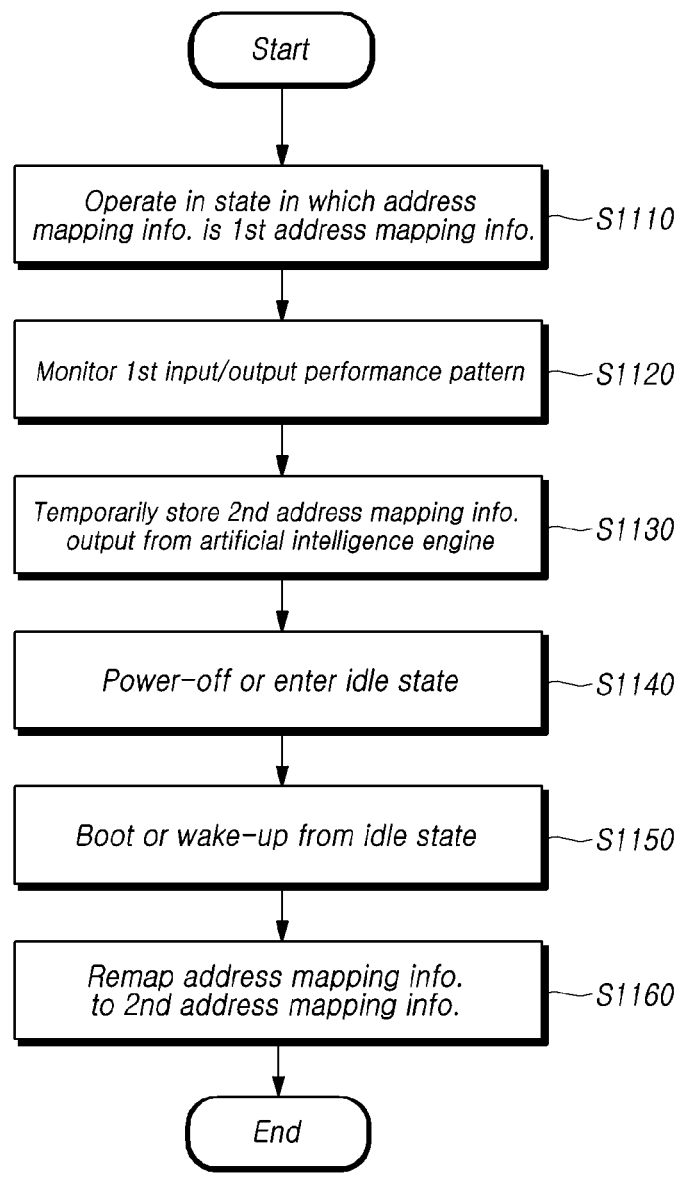
FIG. 11 is a flowchart illustrating an example of an operation of remapping address mapping information by the memory system according to embodiments of the present disclosure.

FIG. 11 is a flowchart illustrating an operation of remapping address mapping information by the memory system 100 according to embodiments of the present disclosure.

Referring to FIG. 11, the memory system 100 may initiate the operation in a state in which the address mapping information corresponding to the target device is the first address mapping information AM1 (S1110).

The memory controller 120 may monitor the first input/output performance pattern IOP1, which is the input/output performance pattern for the target device (S1120).

The memory controller 120 may input (or transfer) information on the first input/output performance pattern to the artificial intelligence engine 130. Further, the memory controller 120 may temporarily store the second address mapping information AM2 which is address mapping information output from the artificial intelligence engine 130 (S1130). For example, the address mapping information corresponding to the target device is still before being remapped to the second address mapping information AM2. Accordingly, the target device may operate in the state in which the address mapping information is the first address mapping information AM1.

The memory controller 120 may remap the address mapping information for the target device to the second address mapping information after the specific time point, instead of immediately remapping the address mapping information for the target device to the second address mapping information. This is to prevent collisions that may occur in the process of accessing the target device due to sudden remapping of address mapping information.

Thereafter, the memory system 100 may be powered off or enter the idle state (S1140).

After operation S1140, the memory system 100 may be booted up (when the power is turned off in operation S1140) or wake up from the idle state (when entering the idle state in operation S1140) (S1150).

After operation S1150, the memory controller 120 may remap the address mapping information corresponding to the working memory 125 or the memory device 110 to the second address mapping information temporarily stored in operation S1130 (S1160).

In the above, the operation of remapping the address mapping information by the memory system 100 has been described. Hereinafter, the operation in which the memory system 100 learns the artificial intelligence engine 130 based on the input/output performance pattern of the target device after the address mapping information is remapped, will be described.

Figure 12:
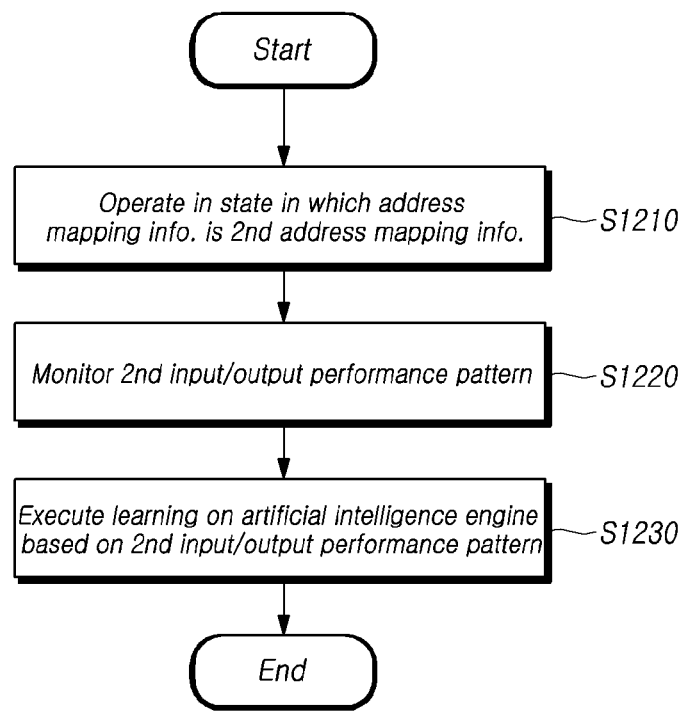
FIG. 12 is a flowchart illustrating an operation of learning the artificial intelligence engine by the memory system according to embodiments of the present disclosure.

FIG. 12 is a flowchart illustrating an operation of learning the artificial intelligence engine 130 by the memory system 100 according to embodiments of the present disclosure.

Referring to FIG. 12, the memory controller 120 may operate in the state in which the address mapping information corresponding to the target device is the second address mapping information AM2 (S1210).

Thereafter, the memory controller 120 may monitor the second input/output performance pattern which is the input/output performance pattern for the target device (S1220).

Furthermore, the memory controller 120 may execute the learning on the artificial intelligence model used by the artificial intelligence engine 130 based on the second input/output performance pattern (S1230).

When the address mapping information corresponding to the target device is remapped from the first address mapping information AM1 to the second address mapping information AM2, the input/output performance of the target device may not always be improved. Accordingly, the memory controller 120 may compare the first input/output performance pattern with the second input/output performance pattern to determine the degree of improvement of the input/output performance of the target device. In addition, the memory controller 120 may learn the artificial intelligence model used by the artificial intelligence engine 130 to enable the artificial intelligence engine 130 to output address mapping information capable of optimizing input/output performance of the target device. In some embodiments, the method used to learn the artificial intelligence model may be the above-described general artificial intelligence model learning method (e.g., gradient descent method, back propagation method).

For example, the memory controller 120 may compare the first input/output performance pattern which is the input/output performance pattern before the address mapping information is remapped, with the second input/output performance pattern which is the input/output performance pattern after the address mapping information is remapped. Further, the memory controller 120 may determine the degree of improvement in the input/output performance. In addition, the memory controller 120 may change the weight value used in the artificial intelligence model (e.g., DNN) used by the artificial intelligence engine 130 according to the degree of improvement in the input/output performance.

Figure 13:
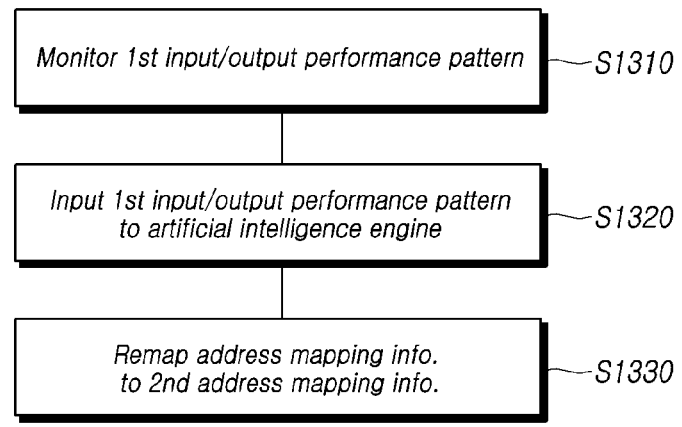
FIG. 13 is a diagram illustrating the method of operating the memory system according to embodiments of the present disclosure.

FIG. 13 is a diagram illustrating the method of operating the memory system 100 according to embodiments of the present disclosure.

Referring to FIG. 13, the operating method of the memory system 100 may include monitoring (S1310) the first input/output performance pattern which is the input/output performance pattern for the target, in the state in which the address mapping information corresponding to the target device capable of inputting/outputting data corresponding to the specific address is the first address mapping information.

In an example, when the target device is the working memory 125, the address mapping information may include chip select mapping information, row mapping information, column mapping information, bank mapping information, and bank group mapping information.

In another example, when the target device is the memory device 110, the address mapping information may include chip enable mapping information.

In addition, the operating method of the memory system 100 may include inputting the first input/output performance pattern monitored in operation S1310 to the artificial intelligence engine 130 (S1320). In some embodiments, the artificial intelligence engine 130 may receive input/output performance patterns of the target device, analyze the input input/output performance patterns based on the preset artificial intelligence model, and output address mapping information for the target device.

As an example, the artificial intelligence engine 130 may cluster the information in the input first input/output performance pattern AM1 into at least one cluster of user data clusters, garbage collection data clusters, firmware code clusters, and map data clusters.

In addition, the operating method of the memory system 100 may include remapping the second address mapping information, which is the address mapping information output from the artificial intelligence engine 130, to address mapping information corresponding to the target device (S1330).

In some embodiments, the address mapping information may be remapped to the second address mapping information in the time point when the memory system 100 boots or wakes up from the idle state.

Further, the operating method of the memory system 100 may include monitoring the second input/output performance pattern, which is the input/output performance pattern for the target device, after address mapping information corresponding to the target device is remapped to the second address mapping information AM2. The operating method of the memory system 100 may further include comparing the second input/output performance pattern with the first input/output performance pattern and executing the learning on the artificial intelligence model used by the artificial intelligence engine 130 in order for the artificial intelligence engine 130 to output address mapping information capable of minimizing latency when inputting/outputting data for the target device.

In some implementations, the operation of the memory controller 120 described above may be controlled by the control circuit 123, and may be performed in such a manner that the processor 124 executes (drives) firmware in which the overall operation of the memory controller 120 is programmed.

Figure 14:
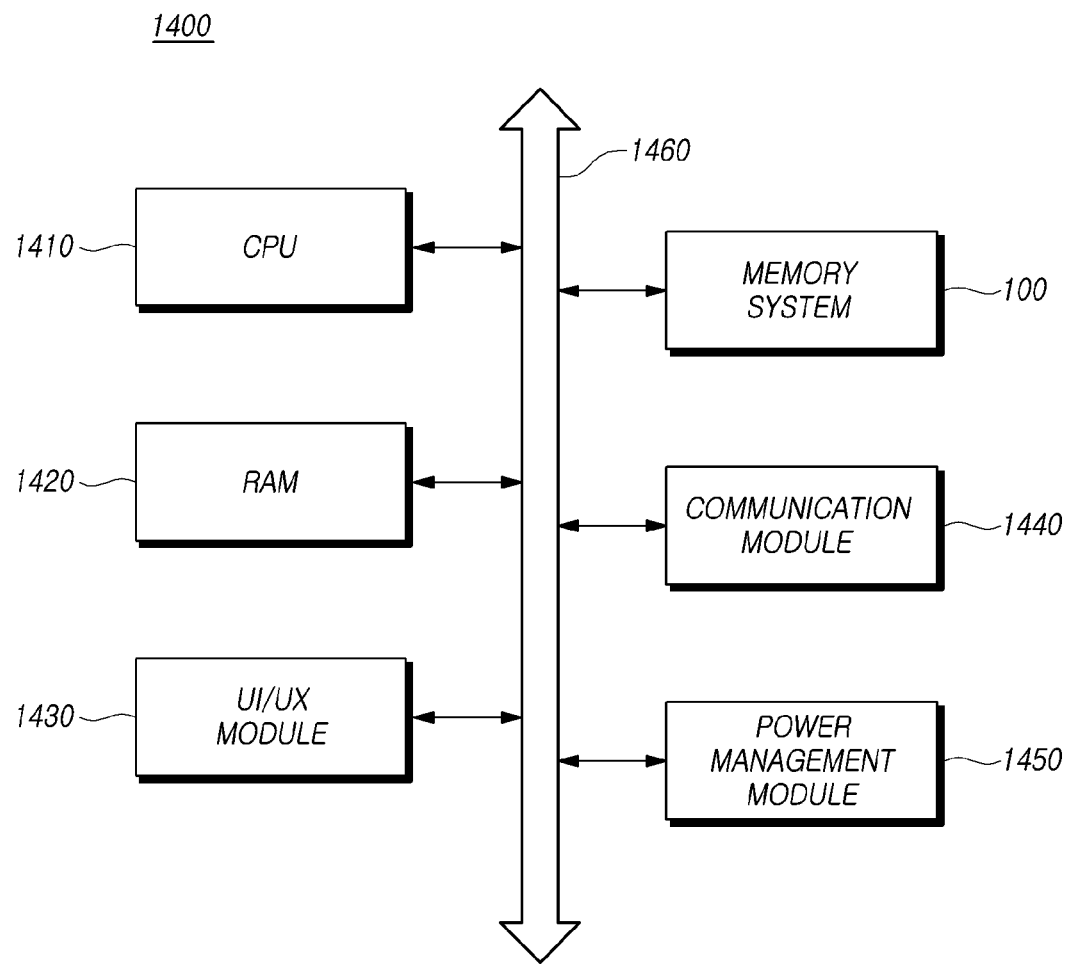
FIG. 14 is a diagram illustrating the configuration of a computing system according to some embodiments of the disclosed technology.

FIG. 14 is a diagram illustrating the configuration of a computing system 1400 according to an embodiment of the disclosed technology.

Referring to FIG. 14, the computing system 1400 may include: a memory system 100 electrically connected to a system bus 1460; a central processing unit (CPU) 1410 configured to control the overall operation of the computing system 1400; a random access memory (RAM) 1420 configured to store data and information related to operations of the computing system 1400; a user interface/user experience (UI/UX) module 1430 configured to provide the user with a user environment; a communication module 1440 configured to communicate with an external device such as a wired and/or wireless type; and a power management module 1450 configured to manage power used by the computing system 1400.

The computing system 1400 may be a personal computer (PC) or may include a mobile terminal such as a smartphone, a tablet or various electronic devices.

The computing system 1400 may further include a battery for supplying an operating voltage, and may further include an application chipset, a graphic-related module, a camera image processor, and a DRAM. Other elements known to a person skilled in the art may be included in the computing system.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure.

While the present invention has been described with respect to the specific embodiments, it will be apparent to those skilled in the art that various changes and modifications may be made without departing from the spirit and scope of the invention as defined in the following claims.

What is claimed is:

1. A memory system comprising:
a memory device; and
a memory controller for communicating with the memory device and controlling the memory device;
wherein the memory controller includes an artificial intelligence engine, and the memory controller is configured to,
receive, by the artificial intelligence engine, a performance pattern of a target device capable of inputting and outputting data corresponding to a specific address, and for analyzing the performance pattern based on an artificial intelligence model and outputting address mapping information capable of reducing latency of input and output data for the target device,
monitor, in a state in which the address mapping information indicating to which information each bit of an address is mapped and corresponding to the target device is first address mapping information, a first performance pattern which is the performance pattern for the target device,
input information on the first performance pattern to the artificial intelligence engine, and
remap a second address mapping information, which is the address mapping information output after the artificial intelligence engine receives the information on the first performance pattern, into address mapping information corresponding to the target device.

2. The memory system of claim 1, wherein the target device is a working memory in the memory controller or the memory device.

3. The memory system of claim 2, wherein, when the target device is the working memory, the address mapping information includes chip select mapping information, row mapping information, column mapping information, bank mapping information, and bank group mapping information.

4. The memory system of claim 2, wherein, when the target device is the memory device, the address mapping information includes chip enable mapping information.

5. The memory system of claim 1, wherein the artificial intelligence engine clusters the information in the first performance pattern into at least one of a user data cluster, a garbage collection data cluster, a firmware code cluster, and a map data cluster.

6. The memory system of claim 5, wherein the artificial intelligence engine clusters the information in the first performance pattern by using a K-means clustering algorithm.

7. The memory system of claim 5, wherein the artificial intelligence engine analyzes the one or more clusters based on a deep neural network (DNN).

8. The memory system of claim 1, wherein the memory controller remaps the address mapping information to the second address mapping information when the memory system boots or wakes up from an idle state.

9. The memory system of claim 1, wherein the memory controller monitors a second performance pattern which is the performance pattern for the target device after the address mapping information corresponding to the target device is remapped to the second address mapping information, and executes, by comparing the second performance pattern with the first performance pattern, a learning on an artificial intelligence model used by the artificial intelligence engine in order for the artificial intelligence engine to output address mapping information capable of minimizing latency of input and output data for the target device.

10. An operating method of a memory system comprising:
monitoring, in a state in which an address mapping information indicating to which information each bit of an address is mapped and corresponding to a target device capable of inputting and outputting data corresponding to a specific address is a first address mapping information, a first performance pattern which is a performance pattern for the target device,
inputting information on the first performance pattern to an artificial intelligence engine which receives the performance pattern of the target device and outputs address mapping information capable of reducing latency of input and output data for the target device by analyzing the performance pattern based on an artificial intelligence model, and
remapping a second address mapping information, which is the address mapping information output by the artificial intelligence engine, into address mapping information corresponding to the target device.

11. The operating method of claim 10, wherein when the target device is a working memory in the memory system, the address mapping information includes chip select mapping information, row mapping information, column mapping information, bank mapping information, and bank group mapping information.

12. The operating method of claim 10, wherein, when the target device is a memory device in the memory system, the address mapping information includes chip enable mapping information.

13. The operating method of claim 10, wherein the information in the first performance pattern is clustered into at least one cluster of a user data cluster, a garbage collection data cluster, a firmware code cluster, and a map data cluster.

14. The operating method of claim 10, wherein the address mapping information is remapped to the second address mapping information when the memory system boots or wakes up from an idle state.

15. The operating method of claim, 10 further comprising:
monitoring a second performance pattern which is the performance pattern for the target device after the address mapping information corresponding to the target device is remapped to the second address mapping information, and
executing, by comparing the second performance pattern with the first performance pattern, a learning on an artificial intelligence model used by the artificial intelligence engine in order for the artificial intelligence engine to output address mapping information capable of minimizing latency of input and output data for the target device.

* * * * *